(12) United States Patent
Ezura

(10) Patent No.: US 6,764,102 B2
(45) Date of Patent: Jul. 20, 2004

(54) TUBE JOINT

(75) Inventor: Takumi Ezura, Toride (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/117,078

(22) Filed: Apr. 8, 2002

(65) Prior Publication Data
US 2003/0178846 A1 Sep. 25, 2003

(30) Foreign Application Priority Data
Mar. 22, 2002 (JP) ......................... 2002-080037

(51) Int. Cl.⁷ .................. F16L 11/12; F16L 25/00; F16L 43/00; F16L 21/06; F16L 35/00
(52) U.S. Cl. .................. 285/45; 285/423; 285/179; 285/903; 285/322; 285/323
(58) Field of Search .................. 285/39, 322, 323, 285/423, 45, 226, 903, 179

(56) References Cited

U.S. PATENT DOCUMENTS

| | | | | |
|---|---|---|---|---|
| 1,650,737 A | * | 11/1927 | Quinn | 285/47 |
| 2,159,811 A | * | 5/1939 | Leonardo | 285/12 |
| 2,465,556 A | * | 3/1949 | Taylor | 285/40 |
| 3,388,705 A | * | 6/1968 | Grosshandler | 128/207.14 |
| 3,791,679 A | * | 2/1974 | Glover | 285/132.1 |
| 3,825,288 A | * | 7/1974 | Maroschak | 285/133.6 |
| 4,037,626 A | * | 7/1977 | Roberts, Jr. | 138/109 |
| 4,606,556 A | * | 8/1986 | Metzger | 285/16 |
| 4,712,809 A | * | 12/1987 | Legris | 285/21.1 |
| 4,718,568 A | * | 1/1988 | Dal Palu | 220/86.2 |
| 4,846,510 A | * | 7/1989 | Mikol | 285/226 |
| 4,890,865 A | * | 1/1990 | Hosono et al. | 285/123.15 |
| 4,909,547 A | * | 3/1990 | Guy | 285/148.28 |
| 5,397,155 A | * | 3/1995 | Inda et al. | 285/4 |
| 5,915,736 A | * | 6/1999 | Marik et al. | 285/21.3 |
| 6,227,578 B1 | * | 5/2001 | Fukui et al. | 285/179 |
| 6,312,019 B1 | * | 11/2001 | Nakazumi et al. | 285/39 |
| 6,398,266 B1 | * | 6/2002 | Crump | 285/226 |
| 6,409,223 B1 | * | 6/2002 | Bartholoma | 285/114 |
| 6,447,019 B1 | * | 9/2002 | Hosono et al. | 285/148.19 |
| 2001/0045748 A1 | * | 11/2001 | Muto | 285/308 |

FOREIGN PATENT DOCUMENTS

| | | | | |
|---|---|---|---|---|
| DE | 10005870 A1 | * | 8/2000 | F16L/37/08 |
| JP | 2000-240875 | | 9/2000 | |

OTHER PUBLICATIONS

Co-pending U.S. patent application Ser. No. 10/117,085 filed on Apr. 8, 2002 by Takumi Ezura, for "Tube Joint" (status pending).

* cited by examiner

Primary Examiner—James M. Hewitt
(74) Attorney, Agent, or Firm—Paul A. Guss

(57) ABSTRACT

A tube joint comprises a joint body which is provided with an attachment/detachment mechanism for attaching/detaching a fluid tube and which is formed of a resin material, and a bellows section which has annular projections and annular recesses alternately formed to be continuous in an axial direction and which disperses external force (impact force) applied to an outer surface of the joint body to avoid any concentration of stress.

4 Claims, 16 Drawing Sheets

TUBE JOINT

BACKGROUND OF THE INVENTION

1. Field of the Invention

The present invention relates to a tube joint for connecting a fluid tube formed with a passage for introducing and discharging a pressure fluid or the like, for example, to a fluid pressure-operated apparatus such as a solenoid-operated valve or a cylinder.

2. Description of the Related Art

A tube joint has been hitherto used in order to connect and couple a fluid tube to a fluid pressure-operated apparatus such as a solenoid-operated valve or a cylinder. As for such a tube joint, a joint body having the fluid tube inside and formed of a resin material is known.

However, when the conventional tube joint as described above is attached, for example, to a portion exposed to the outside, such as an air brake of an automobile or the like, and the tube joint is assembled so that air is supplied to the air brake via a tube connected by the tube joint, then scattered objects such as pebbles or gravel, which are flipped by a rotating wheel of a moving automobile, may collide with the joint body of the tube joint.

As a result, in the conventional tube joint, the joint body formed of the resin material may be deformed by external force (impact force exerted by the scattered object or the like), and some cracks may appear at the portion on which the external force is exerted.

If the joint body is formed of a metal material, the rigidity of the joint body can be increased. However, the weight of the entire vehicle is increased, and it is impossible to realize a light weight. Therefore, a joint body made of resin typically has been used.

SUMMARY OF THE INVENTION

A general object of the present invention is to provide a tube joint which makes it possible to protect a joint body by appropriately buffering the impact force exerted by a scattered object or the like on the joint body made of resin.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
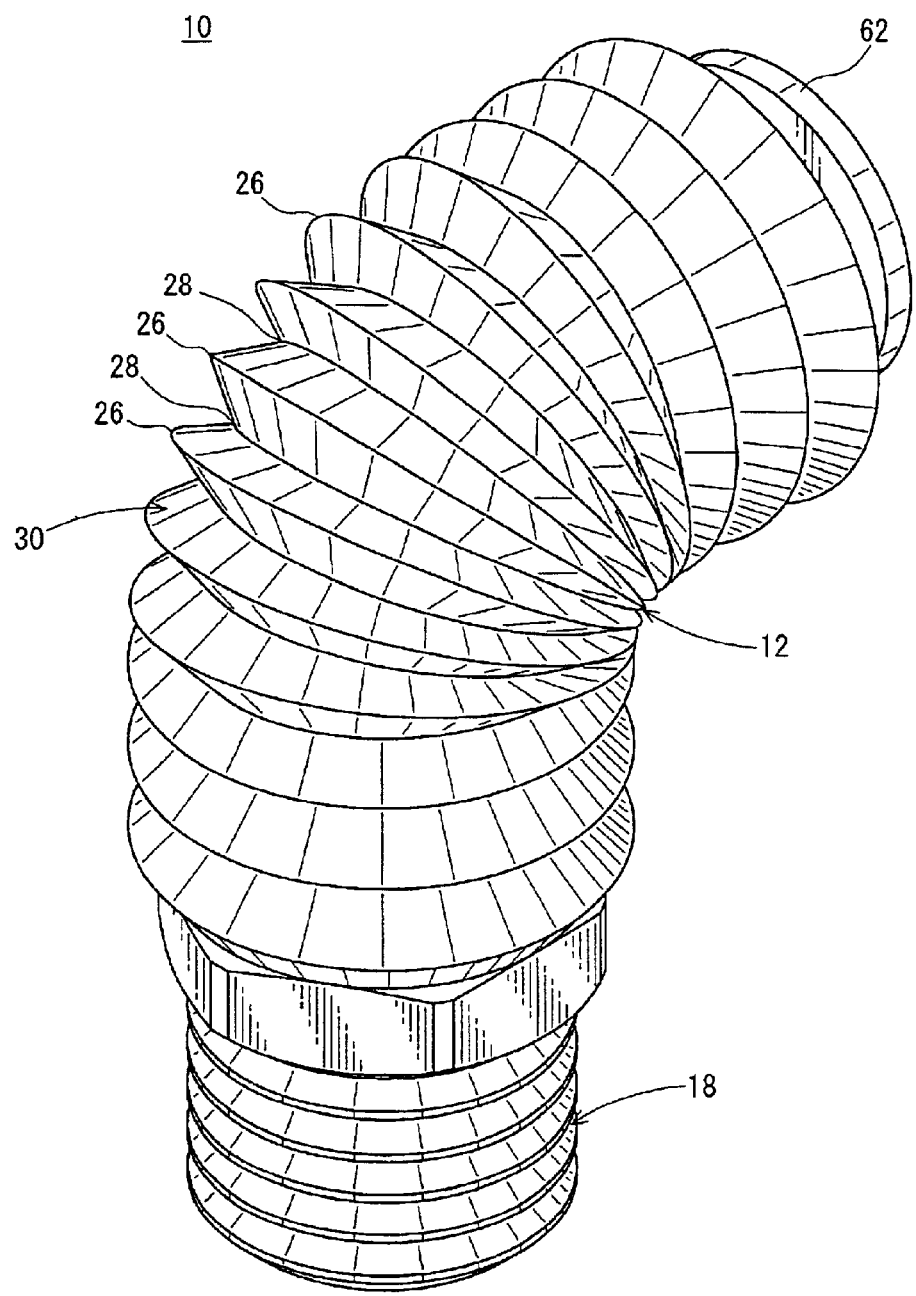
FIG. 1 is a perspective view illustrating a tube joint of a first embodiment according to the present invention.
Figure 2:
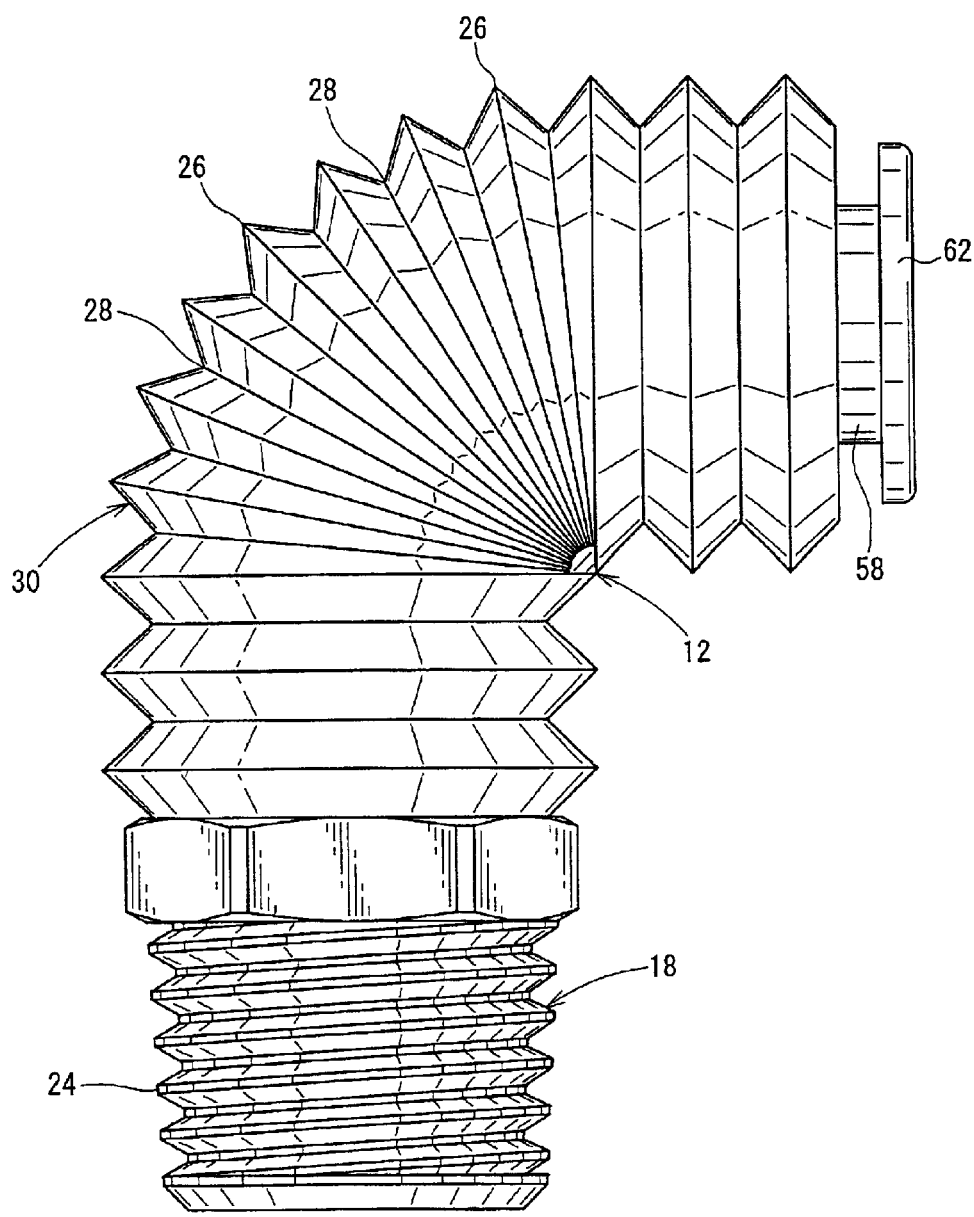
FIG. 2 is a front view illustrating the tube joint shown in FIG. 1.
Figure 3:
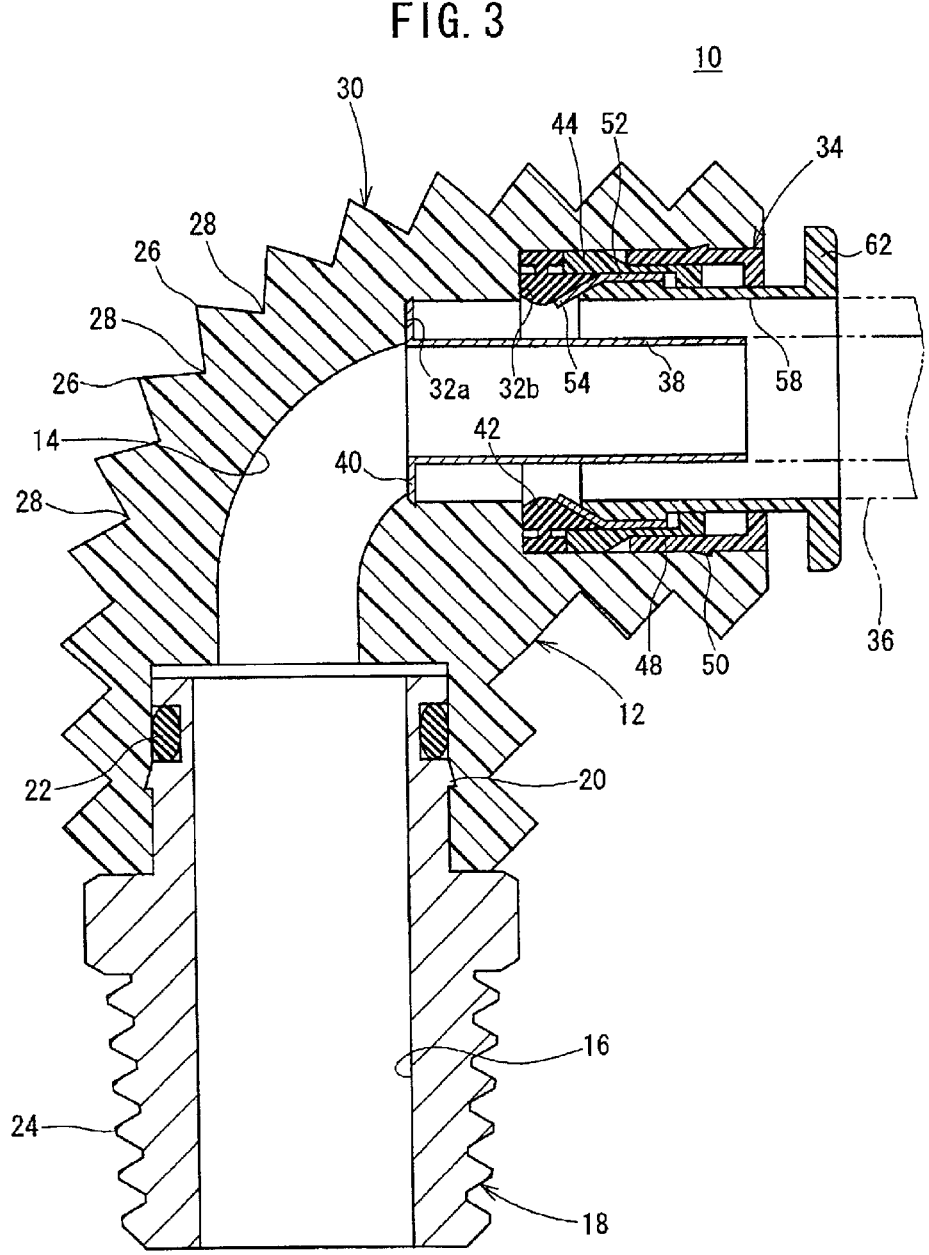
FIG. 3 is a vertical sectional view taken along an axial direction of the tube joint shown in FIG. 1.

With reference to FIGS. 1 to 3, reference numeral 10 indicates a tube joint of a first embodiment according to the present invention. The tube joint 10 has a cylindrical joint body 12. The joint body 12 has a bent form of a substantially L-shaped configuration, for example, with a resin material such as PBT (POLY BUTYLENE TEREPHTHALATE). A penetrating passage 14 is formed in the joint body 12.

A connecting member 18, which is formed of a metal material and has a passage 16 for flowing a pressure fluid therethrough, is connected to one end of the joint body 12. An annular projection 20, which has a sharp cross section, is formed on the outer circumferential surface at one end of the connecting member 18. The annular projection 20 bites into the inner wall surface of the joint body 12, and thus the connecting member 18 is prevented from disengagement from the joint body 12.

An O-ring 22 is installed to an annular groove at the connecting portion between the joint body 12 and the connecting member 18. The pressure fluid, which flows through the joint body 12, is prevented from leakage thereby. A male screw 24 is formed on the outer circumferential surface at the other end of the connecting member 18. The tube joint 10 is connected to an unillustrated fluid pressure-operated apparatus by screw-engaging the male screw 24 into a port (screw hole) formed for the unillustrated fluid pressure-operated apparatus.

A corrugated section 30, which has annular projections 26 and annular recesses 28 having sharp cross sections provided alternately continuously in the axial direction, is formed over the entire surface of the outer circumferential surface of the joint body 12. The corrugated section 30 functions as a buffering section for protecting the joint body 12 by absorbing the impact force applied to the joint body 12, for example, by a scattered object such as a pebble or a gravel.

Figure 5:
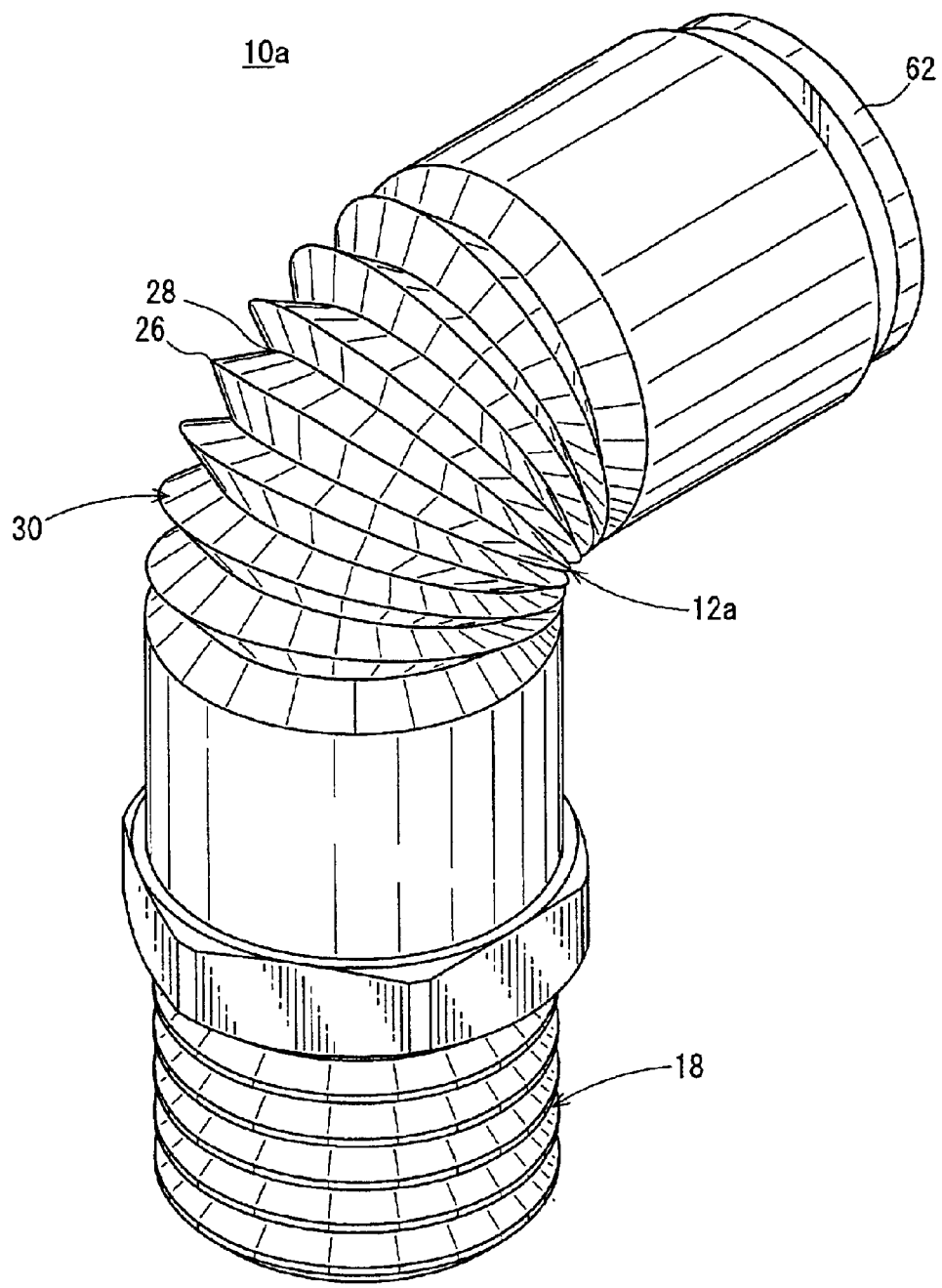
FIG. 5 is a perspective view illustrating a modified embodiment of a corrugated section formed in the tube joint shown in FIG. 1.

The corrugated section 30 may be formed for a part (substantially central portion) of the outer circumferential surface of a joint body 12a as in a tube joint 10a shown in FIG. 5.

Figure 4:
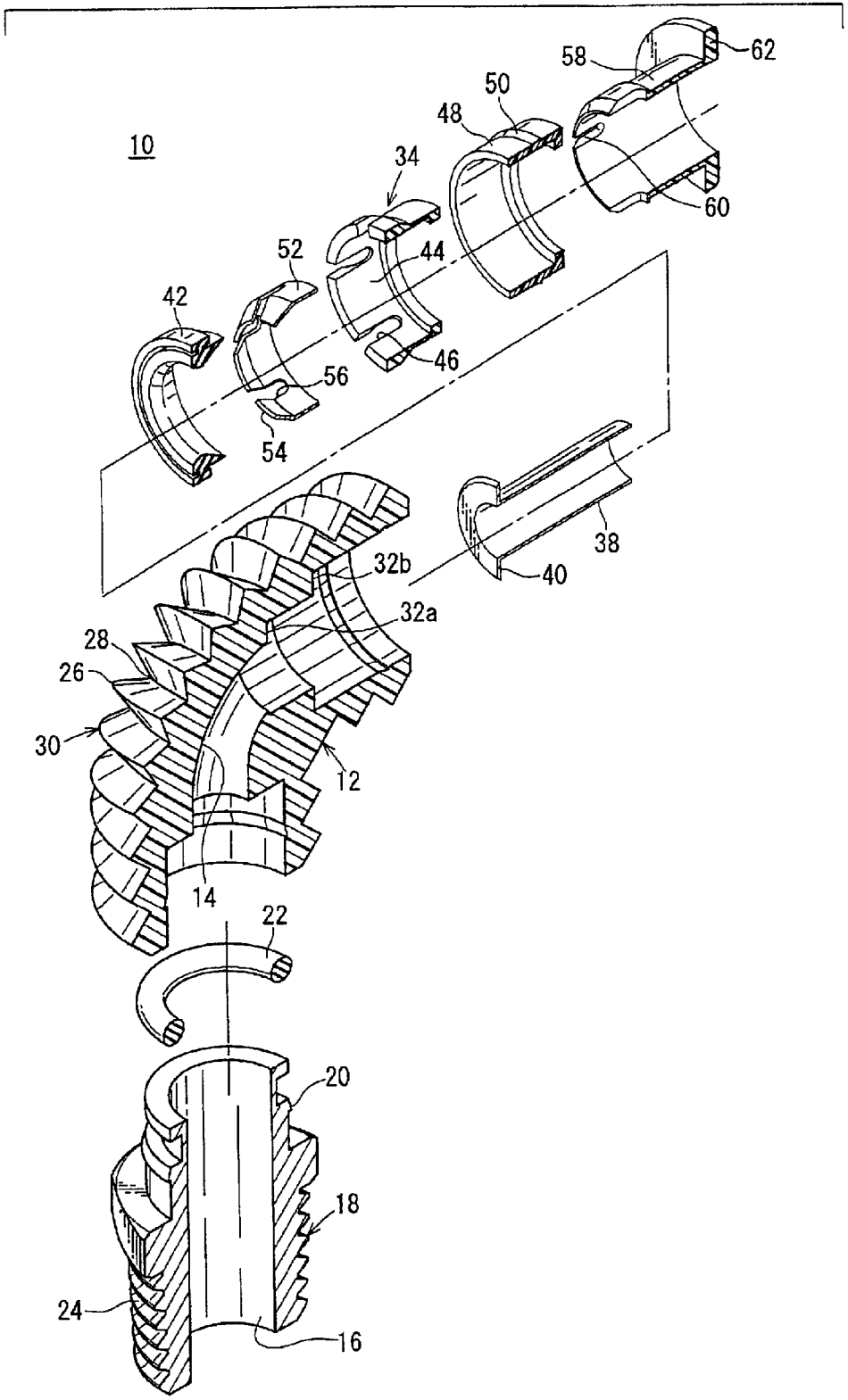
FIG. 4 is an exploded perspective view in vertical cross section taken along the axial direction of the tube joint shown in FIG. 1.

An attachment/detachment mechanism 34 is provided on a first annular step 32a and a second annular step 32b which are formed continuously on the inner wall disposed at the other end of the joint body 12. A sleeve 38, which is inserted into a fluid tube 36, is arranged on the first annular step 32a. The sleeve 38 is fastened to the first annular step 32a by the aid of a flange 40 which is formed at one end of the sleeve 38. A packing 42, which surrounds the outer circumferential surface of the fluid tube 36 to exhibit the sealing function, is installed to the second annular step 32b. One end of a collet 44 abuts against the packing 42. As shown in FIG. 4, a plurality of slits 46, which are separated from each other by predetermined angles in the circumferential direction, are formed for the collet 44.

A cylindrical guide member 48 is inserted into the space between the outer wall at the end of the collet 44 and the inner wall of the joint body 12. A circumscribing annular projection 50, which has a sharp cross section, is formed on the outer circumference of the guide member 48. The annular projection 50 bites into the inner wall of the joint body 12, and thus the guide member 48 is prevented from disengagement from the joint body 12.

A chuck 52, which is formed to have a substantially cylindrical shape with an elastic metal material, is inserted into the collet 44. A fastening section 54, which bites into the outer circumferential surface of the fluid tube 36 to fasten the fluid tube 36, is formed at one end of the chuck 52. A plurality of slits 56, which are separated from each other by predetermined angles in the circumferential direction, are formed for the fastening section 54 of the chuck 52. The fastening section 54 is designed to be elastically deformable in the radial direction by the aid of the plurality of slits 56.

A release bush 58 is inserted into the chuck 52. A plurality of slits 60, which are separated from each other by predetermined angles in the circumferential direction, are formed at one end of the release bush 58. The diameter of the release bush 58 is gradually reduced to make engagement with the fastening section 54 of the chuck 52. A flange 62, which protrudes radially outwardly, is formed at the other end of the release bush 58.

The tube joint 10 according to the first embodiment is basically constructed as described above. Next, its operation, function, and effect will be explained.

The fluid tube 36, which is formed with the passage for allowing the pressure fluid to flow therethrough, is connected to the attachment/detachment mechanism 34. The fluid tube 36 is inserted into the space between the sleeve 38 and the release bush 58. One end of the fluid tube 36 is allowed to abut against the flange 40 of the sleeve 38. In this state, when the fluid tube 36 is slightly pulled in the direction to make separation from the tube joint 10, the fastening section 54 of the chuck 52 bites into the outer circumferential surface of the fluid tube 36. When it is intended to disengage the fluid tube 36 from the tube joint in this state, the fastening section 54 further bites into the outer circumferential surface of the fluid tube 36. Therefore, the fluid tube 36 is reliably prevented from disengagement.

On the other hand, when the flange 62 of the release bush 58 is pressed inwardly into the tube joint 10, then the forward end of the release bush 58 presses the fastening section 54 of the chuck 52 to increase the diameter radially outwardly. The fastening section 54 is released from biting into the outer circumferential surface of the fluid tube 36. Accordingly, the fluid tube 36 can be disengaged with ease.

Next, the buffering function of the corrugated section 30 formed for the joint body 12 will be explained.

Figure 6:
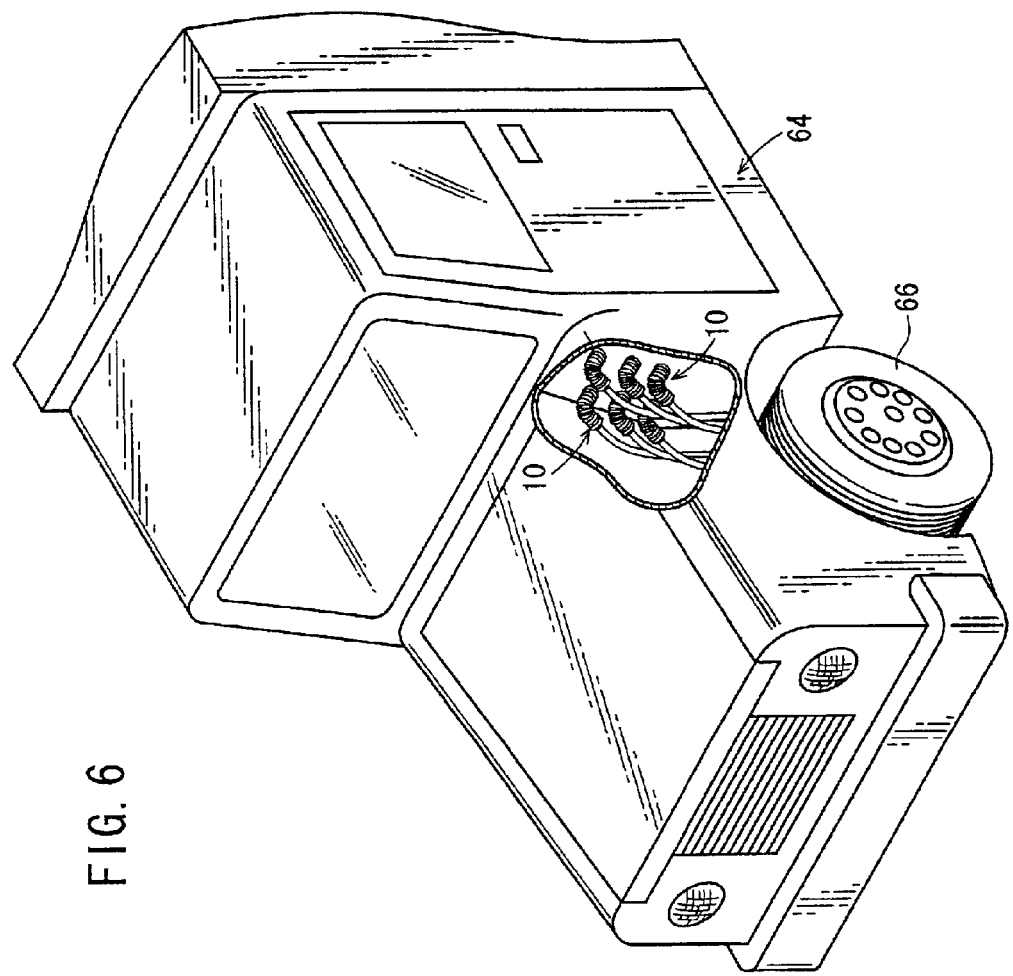
FIG. 6 is, with partial omission and cutout, a perspective view in which the tube joint shown in FIG. 1 is attached to a truck.
Figure 7:
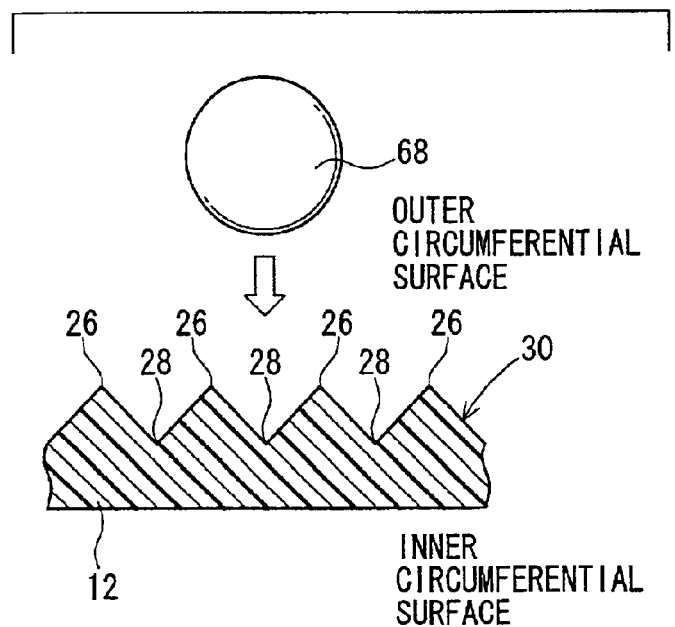
FIG. 7 is, with partial omission, a vertical sectional view illustrating a state immediately before a scattered object collides with the corrugated section of a joint body which constitutes the tube joint shown in FIG. 1.
Figure 8:
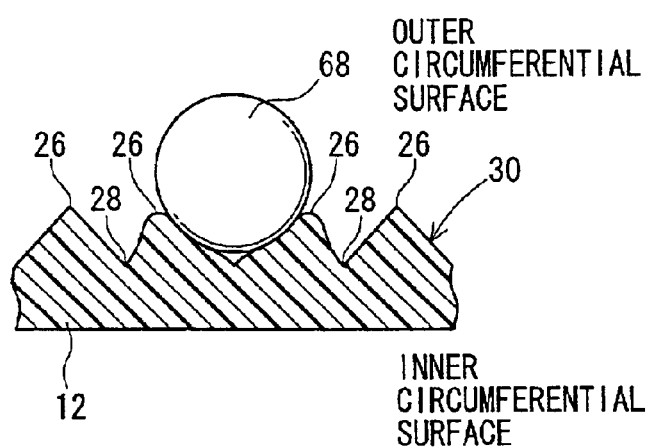
FIG. 8 is, with partial omission, a vertical sectional view in which the scattered object has collided with the corrugated section of the joint body which constitutes the tube joint shown in FIG. 1.

As shown in FIG. 6, the tube joint 10 according to the embodiment of the present invention is installed, for example, to an unillustrated air brake arranged near a wheel (front wheel) 66 of a truck 64. It is assumed that a scattered object 68 such as a pebble or a gravel collides with the outer circumferential surface of the joint body 12 due to the rotary force of the wheel 66 of the truck 64 (see FIG. 7). The scattered object 68 collides with the annular projections 26 of the bellows section 30 formed on the outer circumferential surface of the joint body 12. The impact force of the scattered object 68 is buffered by the deformation of the annular projections 26 of the corrugated section 30. The impact force does not arrive at the inner circumferential surface of the joint body 12 (see FIG. 8).

In other words, the impact force of the scattered object 68 or the like, which is applied to the outer circumferential surface of the joint body 12, is dispersed by the plurality of annular projections 26 of the corrugated section 30 formed on the outer circumferential surface, and thus the concentration of stress is avoided. Therefore, the impact force into the joint body 12 can be buffered.

Figure 9:
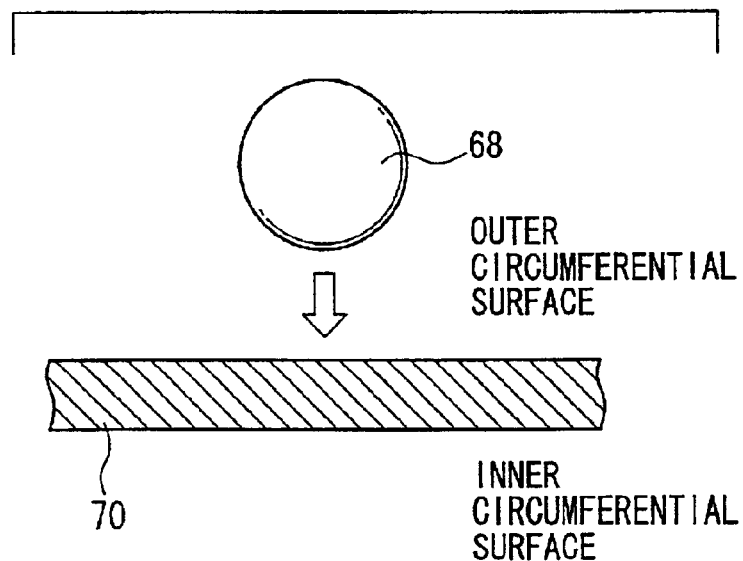
FIG. 9 is, with partial omission, a vertical sectional view illustrating a state immediately before a scattered object collides with an outer circumferential surface of a joint body, for purposes of providing a Comparative Example.
Figure 10:
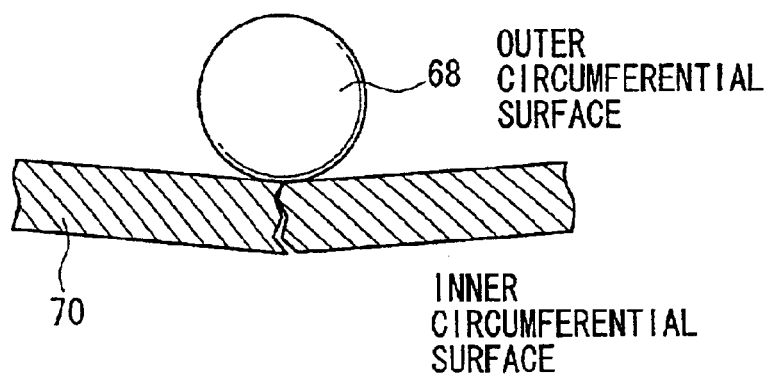
FIG. 10 is, with partial omission, a vertical sectional view in which the scattered object has collided with the outer circumferential surface of a joint body, for purposes of providing a Comparative Example.

On the contrary, as shown in FIGS. 9 and 10, a joint body 70 having a flat outer circumferential surface, for purposes of providing a Comparative Example, does not comprises the corrugated section 30 composed of the plurality of annular projections 26 and annular recesses 28. When the scattered object 58 collides with the flat outer circumferential surface, the impact force of the scattered object 68 is concentrated on the site of collision without being dispersed. Therefore, the impact force arrives at the inner circumferential surface of the joint body 70, and a crack may appear in the joint body 70.

Figure 11:
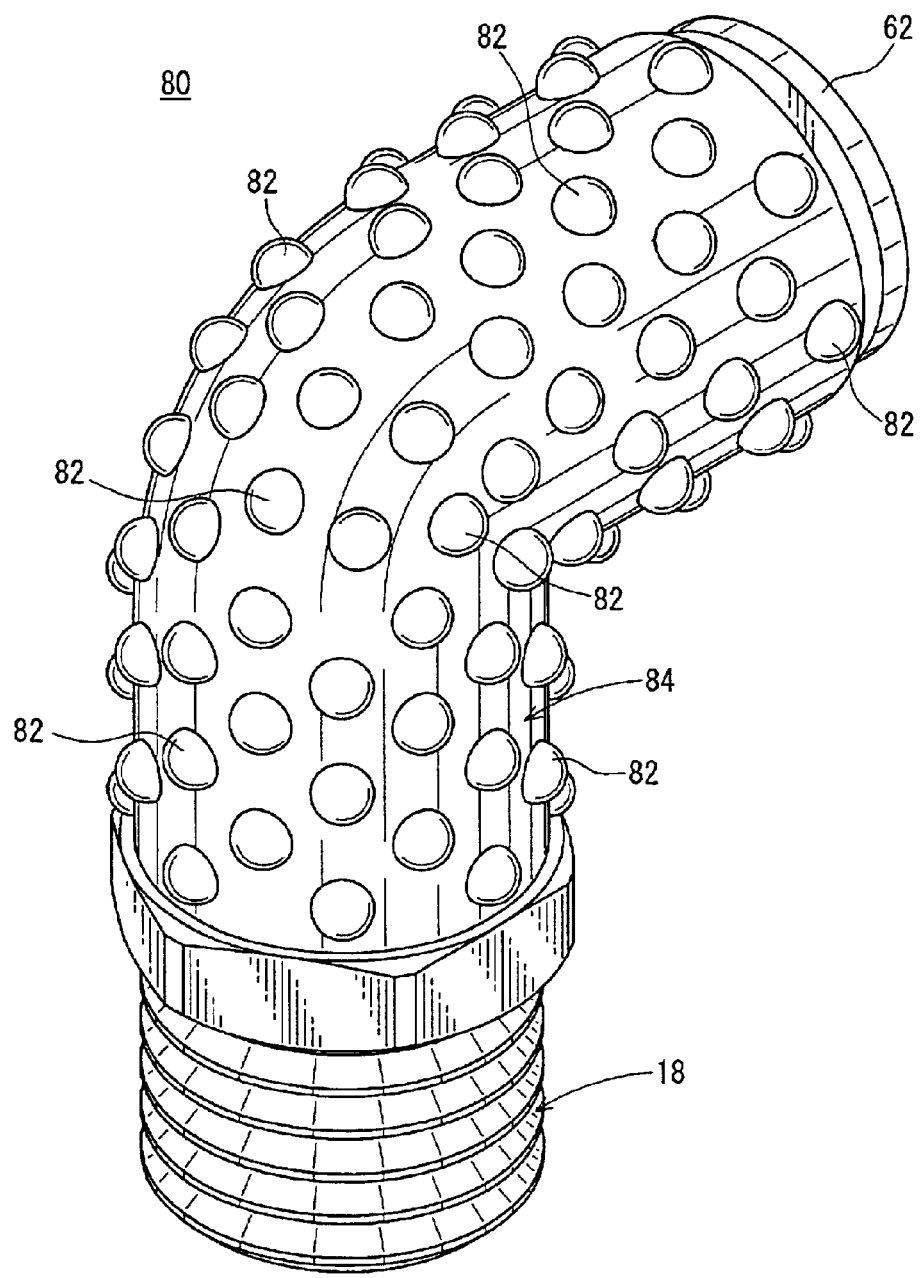
FIG. 11 is a perspective view illustrating a tube joint of a second embodiment according to the present invention.

Next, a tube joint 80 according to a second embodiment of the present invention is shown in FIG. 11. In the following embodiments, the same components as those of the tube joint 10 according to the first embodiment are designated by the same reference numerals, detailed explanation of which will be omitted.

The tube joint 80 according to the second embodiment has the following feature. That is, a plurality of hemispherical protuberances (projections) 82 are formed to expand on the outer circumferential surface of a joint body 84. The corrugated section 30 is replaced with the protuberances 82 which are used as the buffering section for absorbing the external impact force.

Figure 12:
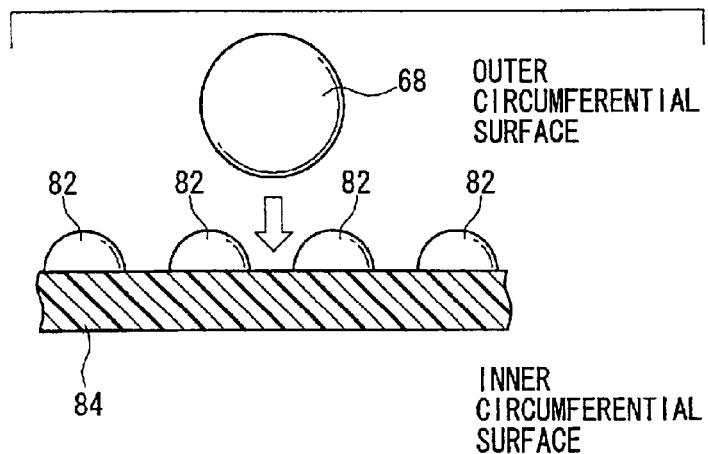
FIG. 12 is, with partial omission, a vertical sectional view illustrating a state immediately before a scattered object collides with protuberances of a joint body which constitutes the tube joint shown in FIG. 11.
Figure 13:
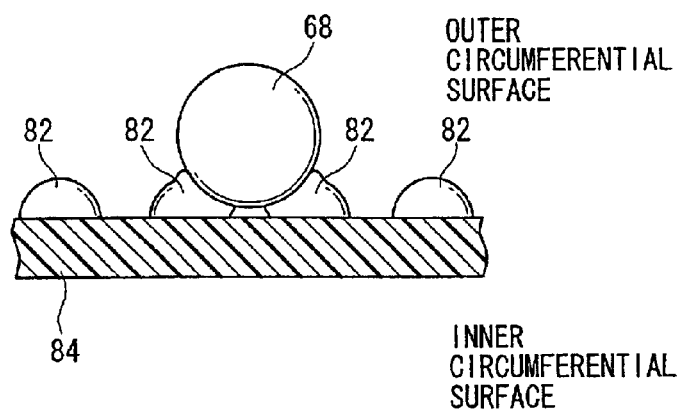
FIG. 13 is, with partial omission, a vertical sectional view in which the scattered object has collided with the protuberances of the joint body which constitutes the tube joint shown in FIG. 11.

Therefore, as shown in FIGS. 12 and 13, when the scattered object 68 collides with the protuberances 82 formed on the outer circumferential surface of the joint body 84, then the impact force of the scattered object 68 is dispersed by the deformation of the protuberances 82 formed in the expanded manner, and thus the concentration of stress is avoided. Therefore, the impact force does not arrive at the inner wall surface of the joint body 84.

Further, when the plurality of protuberances 82 are used as the buffering section, the joint body 84 can be conveniently formed by means of the injection molding with resin, the injection molding being performed with an unillustrated existing mold slightly modified for forming the resin.

The shape of the projection formed on the outer circumferential surface of the joint body 84 is not limited to the hemispherical protuberance 82. The shape of the projection may be a variety of shapes including, for example, columnar configurations, prism-shaped configurations, and composite configurations thereof.

Figure 14:
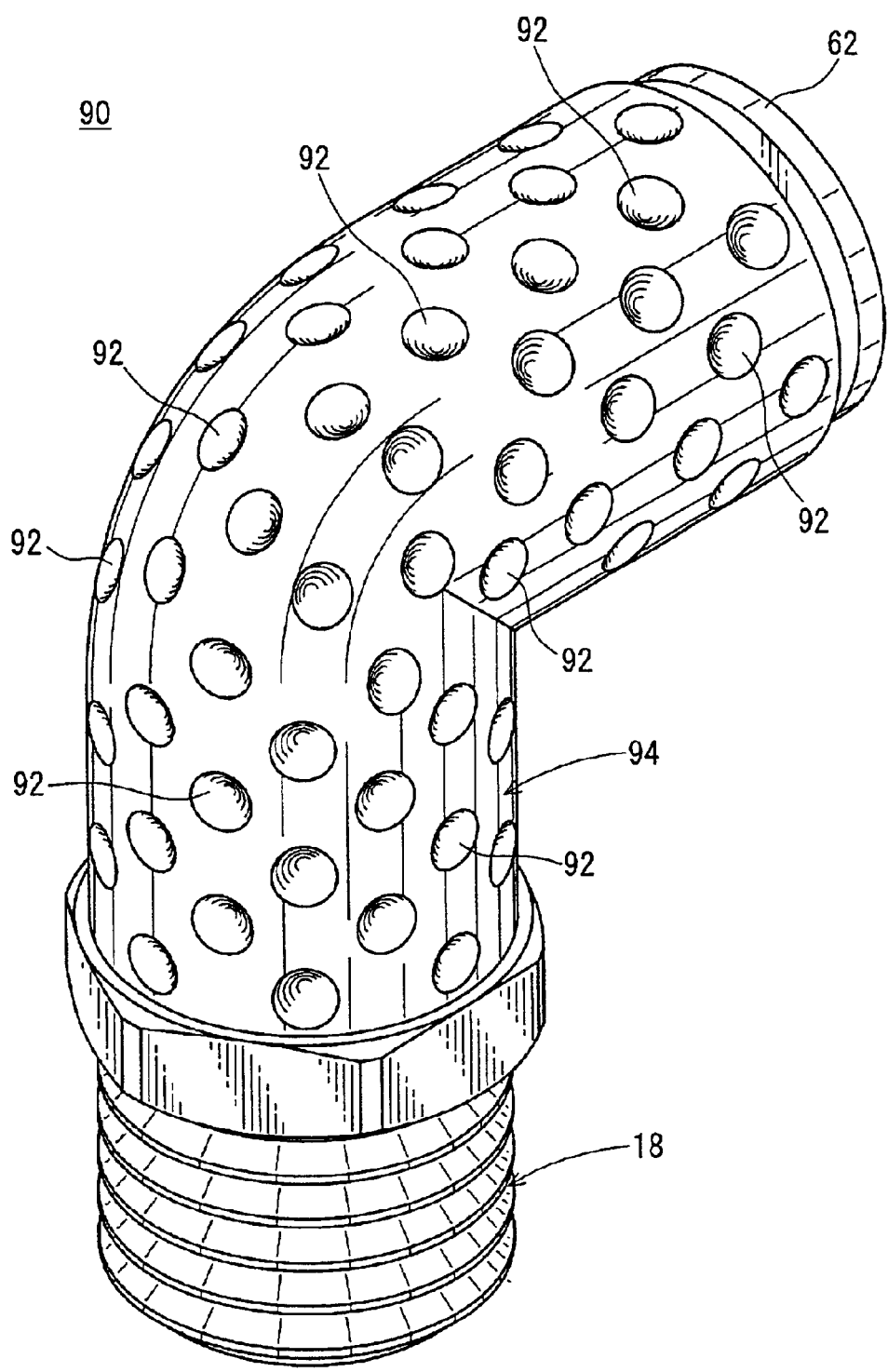
FIG. 14 is a perspective view illustrating a tube joint of a third embodiment according to the present invention.

Next, a tube joint 90 according to a third embodiment is shown in FIG. 14.

The tube joint 90 according to the third embodiment has the following feature. That is, a plurality of hemispherical recesses, i.e., a plurality of dimples 92, which are separated from each other by predetermined spacing distances, are formed on the outer circumferential surface of a joint body 94. The dimples 92 are used as the buffering section for absorbing the external impact force.

Therefore, when the scattered object 68 collides with the outer circumferential surface of the joint body 94, then the impact force of the scattered object 68 is dispersed by the plurality of dimples 92 formed on the outer circumferential surface of the joint body 94, and thus the concentration of stress is avoided. Therefore, the impact force does not arrive at the inner wall surface of the joint body 94.

When the plurality of dimples 92 are used as the buffering section, an unillustrated jig, which is formed with protuberances for making engagement with the dimples 92, may be used to conveniently retain the joint body 94. Accordingly, it is easy to assemble the joint body 94 and the connecting member 18.

The shape of the recess formed on the outer circumferential surface of the joint body 94 is not limited to the hemispherically depressed dimple 92. The shape of the recess may be a variety of depressed shapes including, for example, columnar configurations, prism-shaped configurations, and composite configurations thereof.

Figure 15:
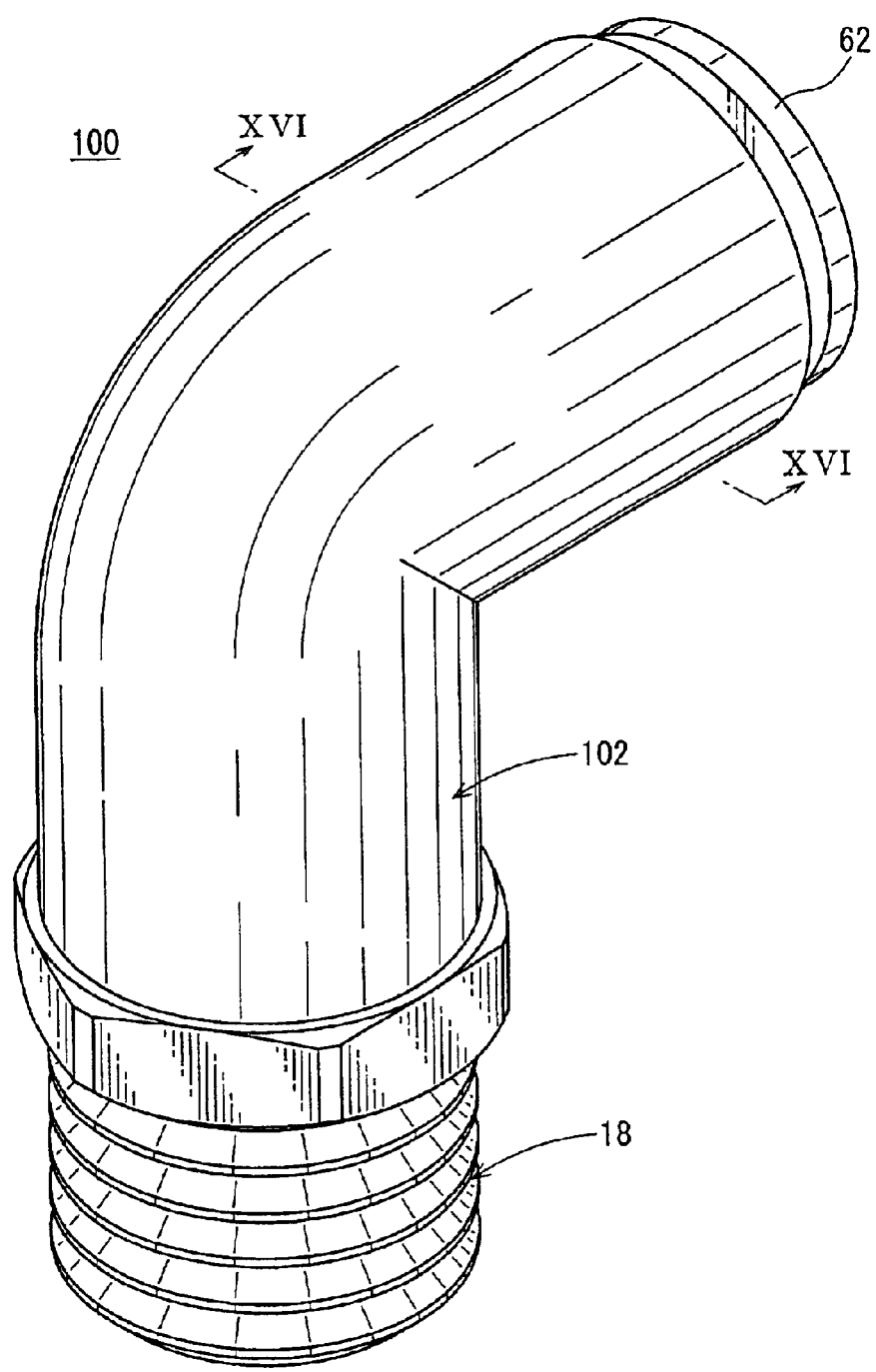
FIG. 15 is a perspective view illustrating a tube joint of a fourth embodiment according to the present invention.
Figure 16:
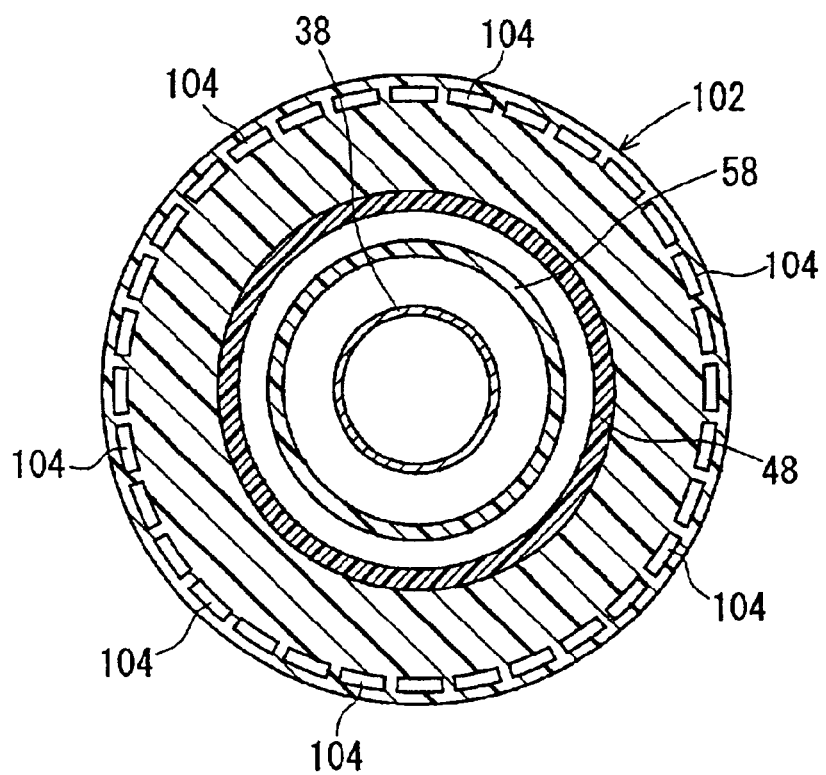
FIG. 16 is a vertical sectional view taken along a line XVI—XVI shown in FIG. 15.

Next, a tube joint 100 according to a fourth embodiment is shown in FIGS. 15 and 16.

The tube joint 100 according to the fourth embodiment has the following feature. That is, a plurality of hollow sections 104 (see FIG. 16), which extend in the axial direction of a joint body 102 and which separate from each other by predetermined angles in the circumferential direction, are formed at portions near the outer surface of the joint body 102. The hollow sections 104 are used as the buffering section for absorbing the external impact force.

As shown in FIG. 16, the hollow section 104 is formed to have a substantially rectangular cross section. However, the cross section of the hollow section 104 may be a variety of cross-sectional shapes including, for example, circular cross sections, polygonal cross sections, and cross sections of composite shapes.

Figure 17:
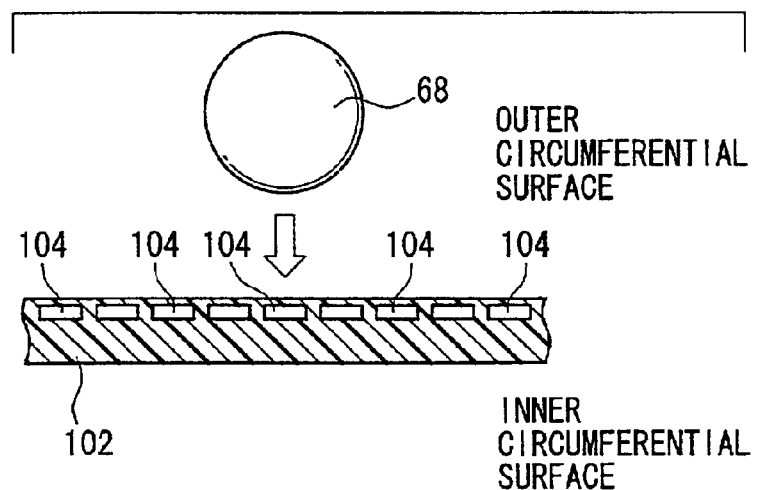
FIG. 17 is, with partial omission, a vertical sectional view illustrating a state immediately before a scattered object collides with an outer circumferential surface of a joint body which constitutes the tube joint shown in FIG. 15.
Figure 18:
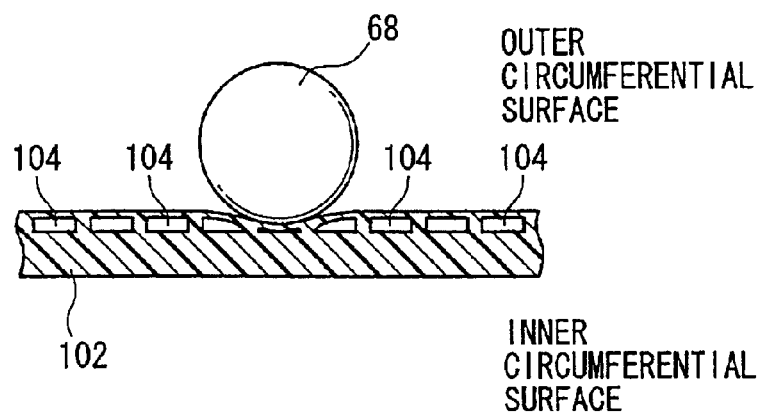
FIG. 18 is, with partial omission, a vertical sectional view illustrating a state in which the scattered object has collided with the outer circumferential surface of the joint body which constitutes the tube joint shown in FIG. 15.

Therefore, when the scattered object 68 collides with the outer circumferential surface of the joint body 102, then the impact force of the scattered object 68 is dispersed by the crush and the deformation of the hollow sections 104 formed near the outer circumferential surface, and thus the concentration of stress is avoided. Therefore, the impact force does not arrive at the inner wall surface of the joint body 102 (see FIGS. 17 and 18).

When the plurality of hollow sections 104 are used as the buffering section, an appearance of the product is beautiful.

Figure 19:
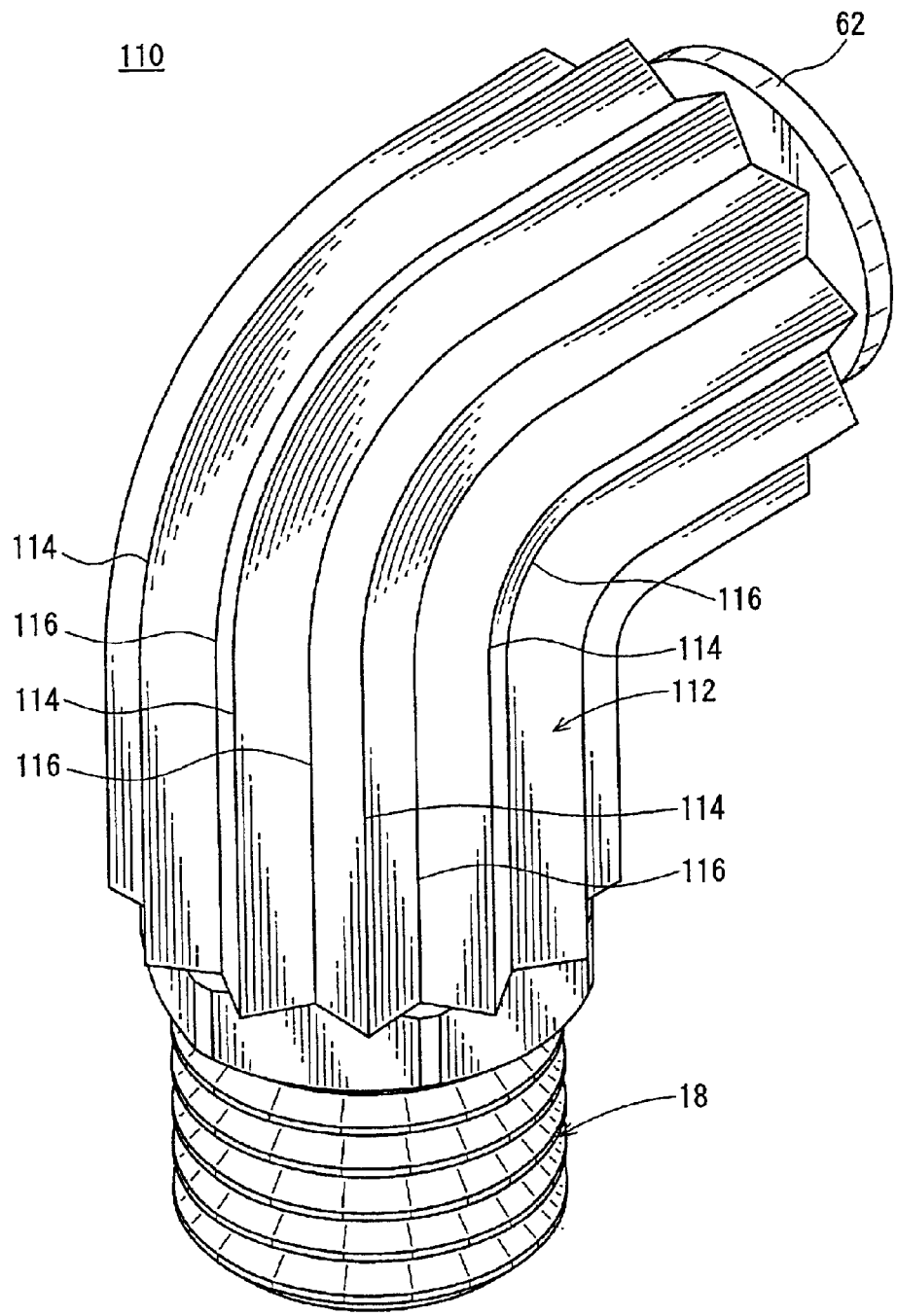
FIG. 19 is a perspective view illustrating a tube joint of a fifth embodiment according to the present invention.

Next, a tube joint 110 according to a fifth embodiment is shown in FIG. 19.

The tube joint 110 according to the fifth embodiment is different from the tube joint 10 shown in FIG. 1 in that a plurality of striped ridges 114 and grooves 116, which extend in parallel to the axis, are provided on the outer surface of a joint body 112 respectively, and the striped ridges 114 and the grooves 116 are formed alternately continuously in the circumferential direction of the joint body 112. The other function and effect are the same as those of the tube joint 10 shown in FIG. 1, detailed explanation of which is omitted.

Figure 20:
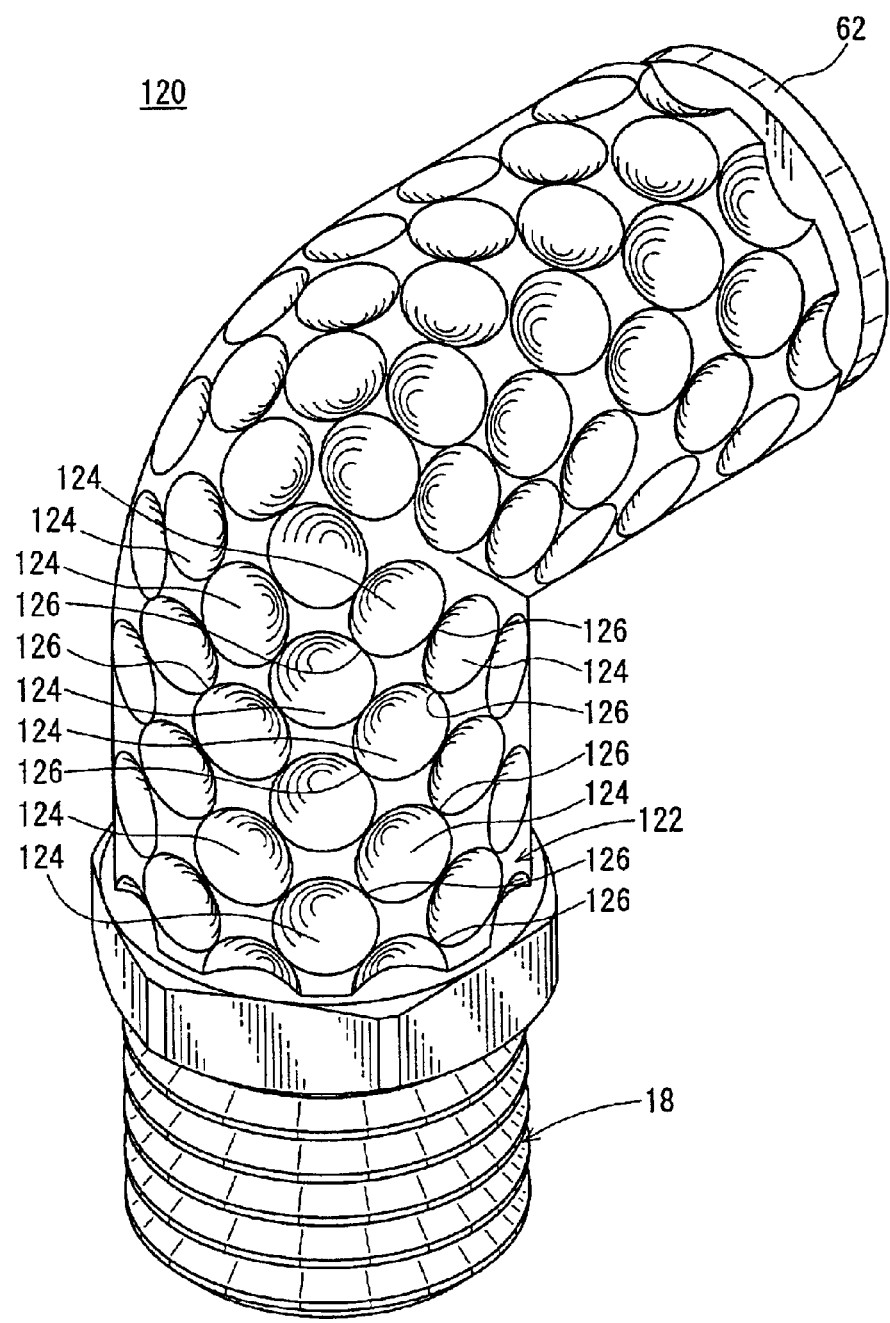
FIG. 20 is a perspective view illustrating a tube joint of a sixth embodiment according to the present invention.

Next, a tube joint 120 according to a sixth embodiment is shown in FIG. 20.

The tube joint 120 according to the sixth embodiment is different from the tube joint 90 according to the third embodiment shown in FIG. 14 in that a plurality of dimples 124 are arranged so that circular crest lines 126 of the dimples 124 formed on the outer surface of a joint body 122 contact with other circular crest lines 126 of the adjoining dimples 124.

In the embodiment, the crest lines 126 between the mutually adjoining dimples 124 are deformed, and function as the buffering section for absorbing the external impact force.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A tube joint comprising:

a substantially rigidly formed joint body farmed of a resin material and which is provided with an attachment/detachment mechanism disposed in a first end of said joint body for attaching/detaching a fluid tube, said joint body having an outer surface and an inner wall surface;

an opening provided in a second end of said joint body for receiving a connecting member therein, said joint body being bent at a predetermined angle between said first end and said second end; and a buffering section formed in said outer surface of said joint body which buffers external forces, by dispersing said external forces exerted on said outer surface of said joint body to avoid any concentration of stress, said buffering section being formed integrally with and of the same resin material as said joint body with no hollow spaces existing between said buffering section and said inner surface of said joint body, wherein said attachment/detachment mechanism comprises a chuck having a fastening section formed at one end thereof, wherein said fastening section bites into an outer circumferential surface of the fluid tube for fastening said fluid tube, and a movable release bush disposed between said chuck and said fluid tube, wherein when said release bush is pressed toward said one end of said chuck, said fastening section disengages from said fluid tube for releasing said fluid tube, wherein said buffering section is composed of a substantially rigid corrugated section including annular projections and annular recesses which are formed alternately continuously in said outer surface of said rigidly formed joint body and wherein said tube joint is installed in a moving vehicle where scattered objects collide with said outer surface of said joint body and wherein said external forces are caused by said objects and are buffered by said buffering section.

2. The tube joint according to claim 1, wherein said corrugated section is formed over an entire surface of said outer surface of said joint body or at a part of said outer surface of said joint body.

3. The tube joint according to claim 1, wherein said attachment/detachment mechanism further comprises:

a sleeve having a flange at one end thereof, said flange being disposed on a first annular step formed in said first end of said joint body, wherein said fluid tube is fitted over said sleeve;

a packing disposed on a second annular step, formed in said first end of said joint body;

a collet disposed in said first end of said joint body next to said packing, said chuck being disposed along an inner annular wall of said collet; and a guide member disposed in said first end: of said joint body next to said collet, said guide member having an annular projection that bites, into said inner wall surface of the joint body in said first end, wherein movement of said release bush is guided by said guide member.

4. The tube joint according to claim 1, said connecting member comprising:

threads formed on an outer circumferential surface of one end thereof;

a connecting portion formed on another end of said connecting member, wherein said connecting portion is inserted into said second end of said joint body;

an o-ring installed in an annular groove formed in said connecting portion; and an annular projection formed on an outer circumferential surface of said connecting portion and which bites into said inner wall surface of the joint body in said second end.

* * * * *